United States Patent [19]

Furuta et al.

[11] Patent Number: 4,678,244
[45] Date of Patent: Jul. 7, 1987

[54] CORE OF RUBBER CRAWLER

[75] Inventors: Mitsuo Furuta, Hiratsuka; Shinji Uchida, Kanawaga, both of Japan

[73] Assignee: Bridgestone Co., Ltd., Tokyo, Japan

[21] Appl. No.: 751,767

[22] Filed: Jul. 2, 1985

[30] Foreign Application Priority Data

Jul. 5, 1984 [JP] Japan .............................. 59-139315

[51] Int. Cl.[4] ........................................... B62D 55/18
[52] U.S. Cl. .................................. 305/57; 305/35 EB; 305/38
[58] Field of Search .................. 305/35 EB, 35 R, 38, 305/57, 56

[56] References Cited

U.S. PATENT DOCUMENTS

| | | | |
|---|---|---|---|
| 1,450,471 | 4/1923 | Wickersham | 305/57 |
| 1,835,627 | 12/1931 | Bauer | 305/57 |
| 4,453,611 | 6/1984 | Stacy, Jr. | 305/57 |

FOREIGN PATENT DOCUMENTS

| | | | |
|---|---|---|---|
| 36833 | 4/1978 | Japan | 305/38 |
| 87667 | 7/1980 | Japan | 305/38 |
| 112369 | 9/1981 | Japan | 305/35 EB |
| 29575 | 2/1984 | Japan | 305/35 R |
| 0096070 | 6/1984 | Japan | 305/38 |

*Primary Examiner*—Randolph A. Reese
*Attorney, Agent, or Firm*—Jordan and Hamburg

[57] ABSTRACT

A rubber crawler core comprises a rectangular core body having longitudinal ends, at least one pair of protrusions integrally formed with the core body, and at least one rib integrally formed with the core body. The protrusions are situated adjacent to the longitudinal ends of the core body and extend upwardly therefrom. The rib extends upwardly from the core body between the protrusions and is oriented perpendicularly to the protrusions. The height of the rib exceeds a middle or center portion of the protrusion. The rubber crawler is formed of an endless crawler body made of a rubber material, and a plurality of the rubber crawler cores embedded therein.

1 Claim, 19 Drawing Figures

CORE OF RUBBER CRAWLER

BACKGROUND OF THE INVENTION

1. Field of the Invention

The present invention relates to cores embedded in a crawler body and also to the structure of a rubber crawler using the cores therein.

2. Description of the Prior Art

Many types of cores 10 for a rubber crawler have so far been proposed; however, they have a pair of protrusions 101 facing with each other and which are provided near the center of a core body 100 as shown in FIG. 17. A rubber crawler 20 using such cores 10 is used as shown in FIGS. 18 and 19. More specifically, an endless rubber crawler body 21 has lugs 22 provided on the outer surface thereof and also holes 23 provided in the crawler body 21 along the center line thereof to be equally spaced apart from each other. Sprocket teeth are engaged in the holes 23. Such cores 10 are embedded in the crawler body 21 between the respective two adjacent engagement holes 23. The rubber crawler 20 is held between a drive tumbler 30 and a take-up tumbler 40, and sprocket teeth 31 of the drive tumbler 30 are engaged in the holes 23. And lower rollers 50 roll on the inner surface of the rubber crawler 20.

Such rubber crawler 20 has been used lately in civil engineering and construction vehicles. Consequently, the crawlers have become larger than those used in conventional vehicles. Also as the weight of the civil engineering and construction vehicles increased, the crawlers became extremely wide. Therefore, the rubber crawlers were required bearing a very high load. For coping with the increased size of such vehicles, the length and strength of the cores embedded in the crawler should be increased correspondingly. To solve these problems, it has been proposed to increase the thickness of the core, or to embed two cores in the direction of the width of the crawler, and various other solutions have been proposed heretofore.

The conventional solution to cope with the larger size of the vehicles by increasing the core thickness results in the increase in thickness of the crawler itself, which unavoidably leads to the increase in manufacturing costs of the rubber crawler. Also this solution is disadvantageous in that the increased flexural rigidity of the crawler caused a loss of rotation resistance. Further, the solution by using two cores embedded in the direction of the crawler width results in no problem due to the increased flexural rigidity; however, bending of the crawler at the center thereof causes various drawbacks.

SUMMARY OF THE INVENTION

It is, therefore, the object of the present invention to provide a core of a rubber crawler, wherein the increase in thickness of the core is minimized, while the core is strong enough to cope with a large size of vehicles and also to provide a rubber crawler in which such cores are used to minimize the increase in manufacturing costs and weight, and also in flexural rigidity to the utmost.

The above objects are attained by providing, according to one aspect of the present invention, a rubber crawler core having at least a pair of protrusions facing each other provided nearer the opposite ends of a core body with a predetermined length and thickness, and a rib provided to extend from the center of the core body generally perpendicularly to the protrusions. The present invention provides a rubber crawler core having, for example, 2 protrusions near each end of the core body, namely, 4 protrusions in total, and also a rib extending between the flanks of two ones facing each other of the 4 protrusions. Further, the above objects are attained by providing, according to another aspect of the present invention, an endless rubber crawler having a crawler body made of a rubber material and which has a plurality of the above-mentioned cores embedded therein with a predetermined spacing from one to another core, the long side of the core body being oriented generally perpendicularly to the longitudinal direction of the crawler body. At least one pair of protrusions provided near the opposite ends, respectively, of the core body is directed away from the crawler body and the rib extending from the center of the core body perpendicular to the protrusions is directed also inwardly of the crawler body.

These and other objects and advantages of the present invention will be better understood from the ensuing explanation made by way of example of the embodiments of the present invention with reference to the drawings.

DETAILED DESCRIPTION OF THE PREFERRED EMBODIMENTS

Figure 1:
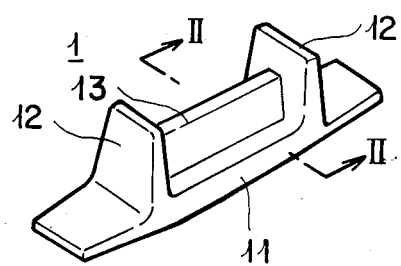
FIG. 1 is a perspective view showing the first embodiment of the core according to the present invention.
Figure 2:
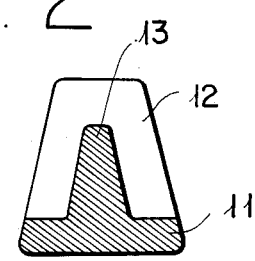
FIG. 2 is a section view taken along the line II—II of FIG. 1.

Referring now to FIGS. 1 and 2, the first embodiment of a core 1 is shown, in which a pair of protrusions 12 facing each other are provided near longitudinal ends, respectively, of a core body 11 with a predetermined length and thickness. A rib 13 is provided to extend from the center of the core body 11 so as to extend between the flanks of the protrusions 12 generally perpendicularly thereto, the height of the rib preferably exceeding the middle of the flank.

Figure 3:
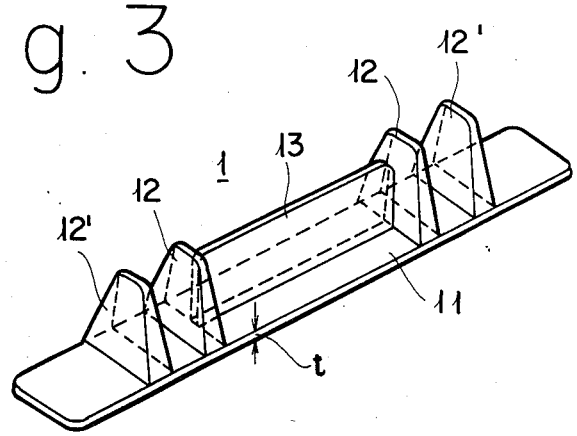
FIG. 3 is a perspective view showing the second embodiment of the inventive core.

FIG. 3 shows a second embodiment of the core 1, in which two protrusions 12, 12' are provided near each end of the core body 11.

Figure 17:
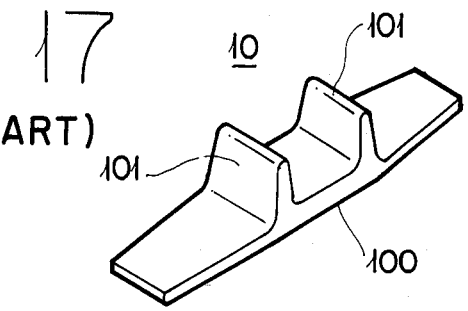
FIG. 17 is a perspective view showing a conventional core.
Figure 18:
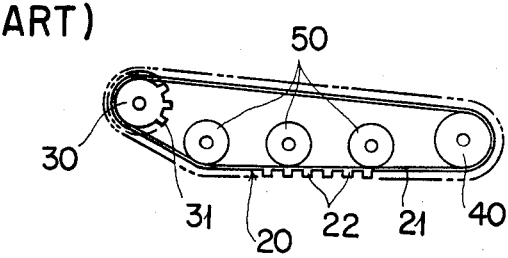
FIG. 18 is a side elevation view showing a portion of a conventional vehicle using the conventional crawler.
Figure 19:
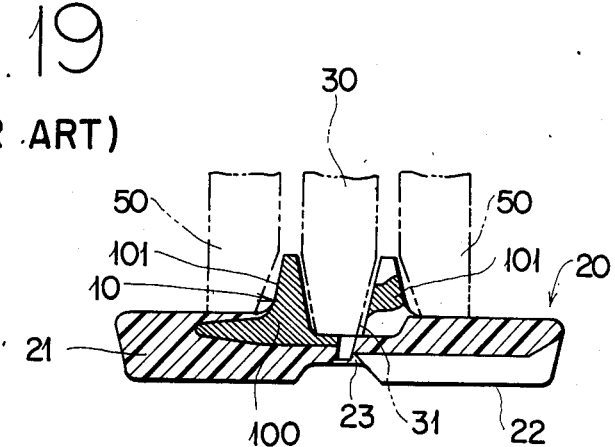
FIG. 19 is a sectional view of a conventional rubber crawler.

For example, with the core 10 as shown in FIG. 17, assume that it is 200 mm or so in length and about 30 mm wide. The core 10 needs a thickness of more than 20 mm at the center thereof for withstanding a weight of 2 tons, which has been proved by the experiments. In the embodiment shown in FIG. 3, when the core 1 was the same in length and width as above, the thickness at the center thereof being about 10 mm, approximately a half of the above, to provide a sufficient strength against the weight 2 tons.

Figure 4:
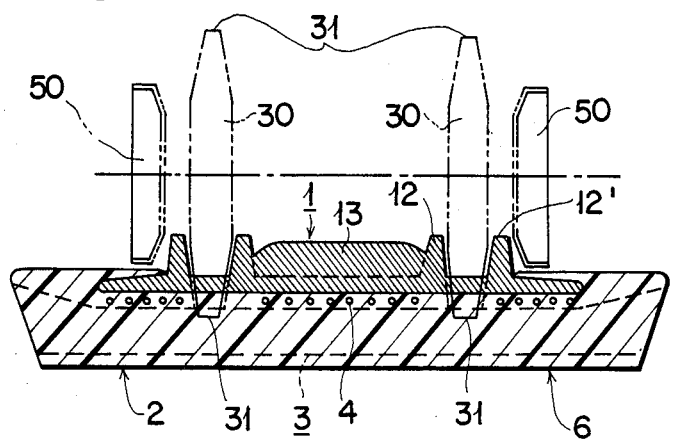
FIG. 4 is a sectional view of the rubber crawler according to the present invention.
Figure 5:
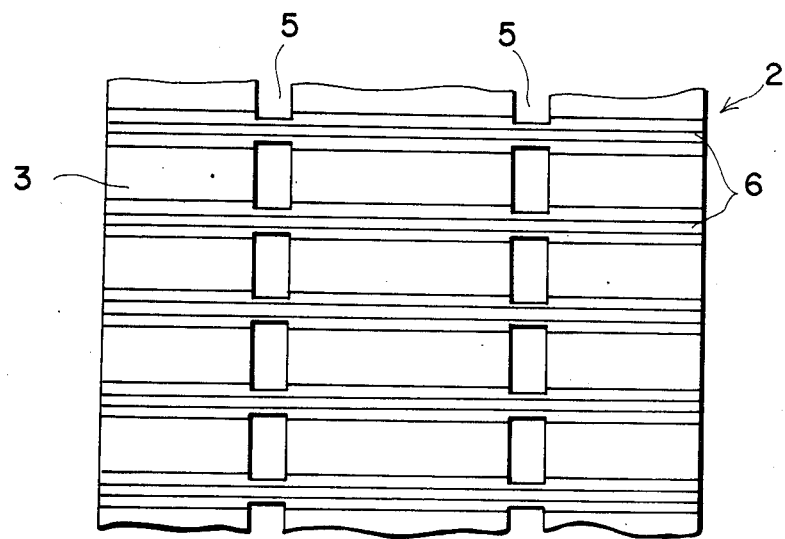
FIG. 5 is a bottom view of the rubber crawler of FIG. 4.

A rubber crawler 2 is formed, by way of example, as shown in FIGS. 4 and 5. Namely, a drive tumbler 30 has formed thereon 2 rows of sprocket teeth 31, and the crawler body 3 has formed therein 2 rows of holes 5 in which the sprocket teeth 31 are engaged, and lugs 6 on the outer surface thereof. The core 1 used in this crawler is the one shown in FIG. 3. There are provided reinforcing members 4 embedded under the core 1 in the crawler 2. The reference numeral 50 in FIG. 4 denotes so-called outer rollers which roll outside the respective protrusions 12'. It is obvious to those skilled in the art that these outer rollers 50 may be so-called inner rollers which roll on the same way as the sprocket, namely, the drive tumbler 30.

Figure 6:
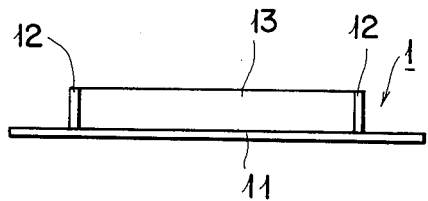
FIGS. 6 to 12 are front views each showing a variation of the inventive core.
Figure 7:
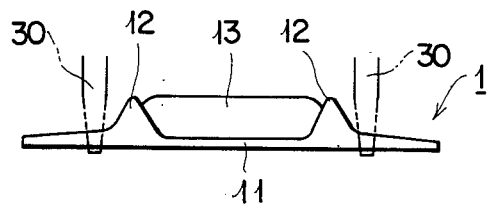
Figure 8:
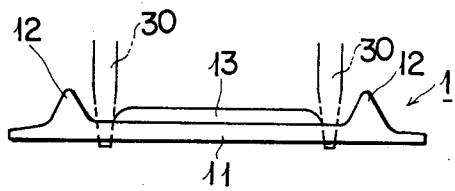
Figure 9:
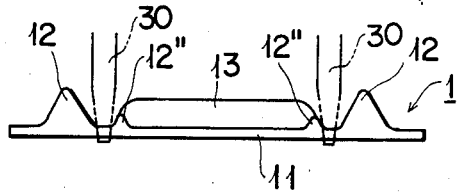
Figure 10:
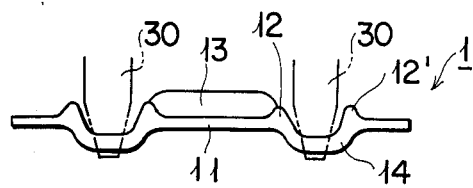
Figure 11:
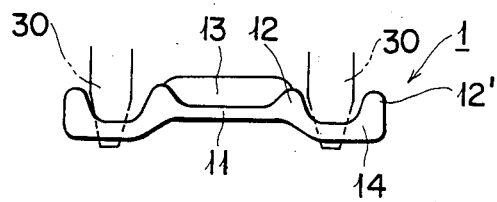
Figure 12:
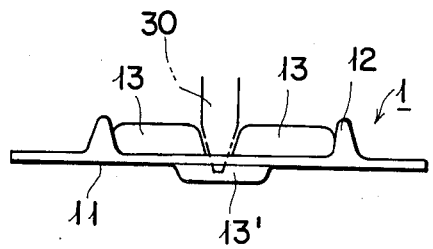
Figure 14:
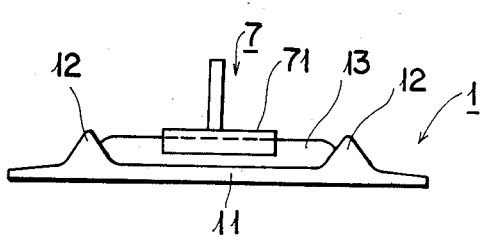
FIG. 14 is a schematic sectional view of a rubber crawler driven by the drive tumbler of FIG. 13.

FIGS. 6 to 12 show each a variation of the core 1 having been described in the foregoing. FIG. 6 shows a core 1 including a core body 11 provided with protrusions 12 and rib 13, all being parallel flat plates. In this variation, the drive tumblers 30 are to be disposed outside the respective protrusions 12 as in FIG. 7. FIGS. 8 and 9 show cores, wherein each rib 13 in the center is not contiguous to the protrusions 12; in the variation in FIG. 9, the rib 13 has a small protrusion 12" provided at both ends thereof. In case of such core 1, the drive tumbler 30 can be positioned inside the protrusion 12 as shown. FIGS. 10 and 11 show cores 1 having core bodies 11, wherein each portion corresponding to the drive tumbler 30 is made concave as shown at the reference numeral 14; the variation shown in FIG. 11 has eliminated therefrom portions of the core body 11 which would otherwise extend outwardly of the respective concave portions 14. FIG. 12 shows a core having a rib 13 provided between the protrusions 12, but in this variation, a portion of the rib 13 (the central portion 13' shown in Figure) is formed at the side opposite to the protrusions 12.

Figure 13:
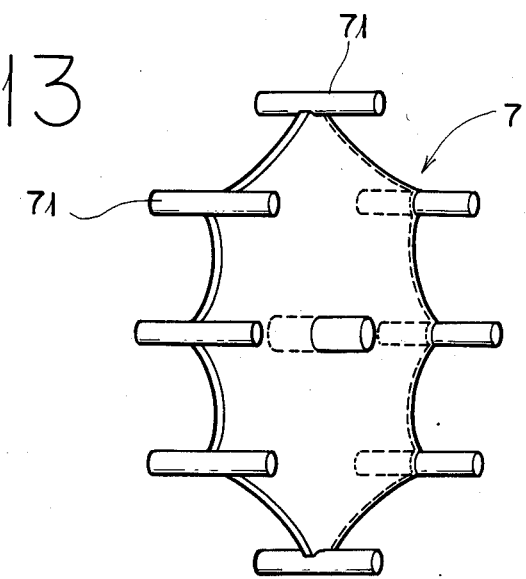
FIG. 13 is a perspective view showing an example of the drive tumber.

The vehicle is driven by the combinaton of the sprocket teeth 31 and engagement holes 5 as well as by a drive tumbler 7 as shown in FIG. 13. The drive tumbler 7 has provided thereon pins 71 as equally spaced. By engaging the pin 71 with the rib 13 of the core 1, a drive force is provided. In this case, however, the rib 13 of the core 1 should be made so high as to engage with the pin 71.

Figure 15:
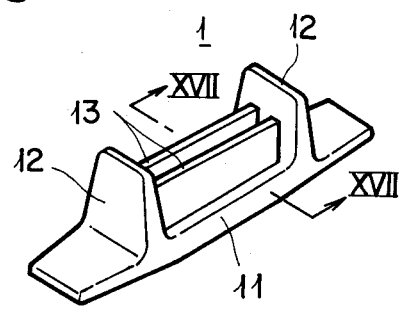
FIG. 15 is a perspective view showing yet another variation of the core.
Figure 16:
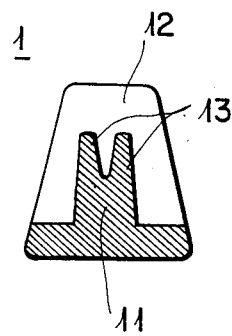
FIG. 16 is a sectional view taken along the line XVI—XVI of FIG. 15.

It should be noted that the rib 13 of the core 1 may be formed in 2 rows as shown in FIGS. 15 and 16. Also it has been proved that even if the space between the rows of ribs 13 is deeper, the ribs hold a sufficient strength.

As having been described in the foregoing, the inventive core has provided near the opposite ends of the core body with a predetermined length and thickness at least a pair of protrusions facing each other, there being provided a rib extending from the center of the core body perpendicular to the protrusions, the height of the rib preferably extending above the middle of the flank; therefore, the requirements for increasing the size of the crawler due to increase of the size of the vehicles are met while the core thickness can be maintained as small as possible and a sufficient strength can be assured.

Also, a core provided with two protrusions near each end of the core body, namely, with four protrusions in total, can be made thinner and have an improved strength.

The rubber crawler according to the present invention has an endless crawler body made of rubber material and which has a plurality of the above-mentioned cores embedded therein with a predetermined spacing from one to another core, the short side of the core body being directed generally along the length of the crawler body, at least one pair of protrusions provided near the opposite ends of the core body being directed away from the crawler body and the rib extending perpendicularly to the crawler body from the center of the core body so that the height of the rib exceed the middle of the protrusion flanks. Thus, the crawler can have an improved strength and any remarkable increase in flexural rigidity of the crawler can be prevented, without increasing the thickness of the crawler core. Also, the presence of the rib permits to drive the crawler by the drive tumbler with sprocket teeth as well as the drive tumbler with pins. Therefore, the inventive crawler is not limited in this application and can be used for crawlers of various larger-sized vehicles.

What is claimed is:

1. A rubber crawler core, comprising:
   a rectangular core body having longitudinal ends;
   at least one pair of protrusions integrally formed with the core body, said protrusions being situated adjacent to the longitudinal ends of the core body and extending upwardly therefrom;
   at least one rib integrally formed with the core body, said rib extending upwardly from the core body between the protrusions in an orientation perpendicular to the protrusions, each rib having a height exceeding a middle or center portion of the protrusion; and
   an additional protrusion formed adjacent each respective protrusion of said pair of protrusions, each additional protrusion being spaced from the respective adjacent protrusion of said pair of protrusions outwardly toward the longitudinal end of the core body to permit a drive tumbler to pass between the protrusion and the additional protrusion.

* * * * *